US 12,540,670 B2

(12) United States Patent
Tabata et al.

(10) Patent No.: US 12,540,670 B2
(45) Date of Patent: Feb. 3, 2026

(54) WORK VEHICLE

(71) Applicant: Kubota Corporation, Osaka (JP)

(72) Inventors: Shinya Tabata, Sakai (JP); Takeshi Satozono, Sakai (JP); Kunihiro Yoneguchi, Sakai (JP); Kazuhiro Tanaka, Sakai (JP); Michisuke Iga, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/979,719

(22) Filed: Dec. 13, 2024

(65) Prior Publication Data

US 2025/0320917 A1 Oct. 16, 2025

(30) Foreign Application Priority Data

Apr. 11, 2024 (JP) ................................. 2024-064043

(51) Int. Cl.
*F16H 59/10* (2006.01)
(52) U.S. Cl.
CPC ................................. *F16H 59/105* (2013.01)
(58) Field of Classification Search
CPC ........................ F16H 59/105; F16H 2059/6823
See application file for complete search history.

(56) References Cited

U.S. PATENT DOCUMENTS 9,689,488 B2 * 6/2017 Youn .................... F16H 59/0204
2018/0056772 A1 3/2018 Teraoka et al.

FOREIGN PATENT DOCUMENTS

| CN | 112503169 A | * | 3/2021 | ......... F16H 59/0278 |
| JP | H1038064 A | * | 2/1998 | |
| JP | 2000006680 A | * | 1/2000 | |
| JP | 201834680 A | | 3/2018 | |

* cited by examiner

*Primary Examiner* — Bobby Rushing, Jr.
(74) *Attorney, Agent, or Firm* — The Webb Law Firm

(57) ABSTRACT

A work vehicle includes a shift operation tool to operate a shift position of a transmission device; an engine control unit to start an engine based on a start command from a start operation tool and an operation state of the shift operation tool; a neutral position detector to detect the shift operation tool being at a neutral position and output a neutral position signal; an operation displacement amount detector to detect an operation displacement amount of the shift operation tool and output an operation displacement amount signal; a first safety confirmation section to confirm a first safe state in response to the neutral position signal; and a second safety confirmation section to confirm a second safe state based on the operation displacement amount. The engine control unit starts the engine in response to the start command received with the first safe state and the second safe state being confirmed.

4 Claims, 4 Drawing Sheets

WORK VEHICLE

CROSS-REFERENCE TO RELATED APPLICATION

This application claims priority to Japanese Patent Application No. 2024-064043 filed Apr. 11, 2024, the disclosure of which is hereby incorporated by reference in its entirety.

BACKGROUND OF THE INVENTION

1. Field of the Invention

The present invention relates to a work vehicle including an engine, a start operation tool configured to output a start command, a shift operation tool configured to operate the shift position of a transmission device, and an engine control unit configured to start the engine based on the start command and the operation state of the shift operation tool.

2. Description of Related Art

A work vehicle in Japanese Unexamined Patent Application Publication No. 2018-034680 (see paragraph 0034, FIG. 7, FIG. 8) includes a PTO clutch lever swingable around a swing axis extending in a body right-left direction, and the PTO clutch lever is selectable between an ON position where a PTO clutch transmits power and an OFF position where the PTO clutch is disconnected. The work vehicle includes an emergency stop switch configured to detect the PTO clutch lever being at the OFF position, so that the work vehicle cannot start an engine while the PTO clutch lever is at the ON position.

SUMMARY OF THE INVENTION

Even a work vehicle including no PTO device (power take-off) causes such an inconvenience that an engine starts while a transmission device is in a state not suitable for engine starting. The work vehicle travels under an adverse environment in comparison with passenger cars and the like, and therefore, the work vehicle easily causes a malfunction such as a short-circuit of a signal wire. In such a case, the engine may start while the transmission device is in the state not suitable for engine starting.

An object of the present invention is to provide a work vehicle that restrains an engine from starting due to a short-circuit of a signal wire or the like while a transmission device is in a state not suitable for engine starting.

A work vehicle according to the present invention includes: an engine; a start operation tool configured to output a start command; a shift operation tool configured to operate a shift position of a transmission device; an engine control unit configured to start the engine based on the start command and an operation state of the shift operation tool; a neutral position detector configured to detect the shift operation tool being at a neutral position and output a neutral position signal; and an operation displacement amount detector configured to detect an operation displacement amount of the shift operation tool and output an operation displacement amount signal. The engine control unit includes: a first safety confirmation section configured to confirm a first safe state in which the shift operation tool is at the neutral position, in response to the neutral position signal; and a second safety confirmation section configured to confirm a second safe state in which the shift operation tool is at the neutral position, based on the operation displacement amount. The engine control unit is configured to start the engine in response to the start command received with the first safe state and the second safe state being confirmed.

With this configuration, the work vehicle includes a detector configured to detect the operation position of the shift operation tool for determining the shift state of the transmission device, and a detector for detecting the operation displacement amount of the shift operation tool. The engine control unit receives respective detecting signals from the detectors. The engine control unit determines whether or not the vehicle is in a state suitable for engine starting, based on the two detecting signals. When the vehicle is in the suitable state, the engine control unit starts the engine. That is, a fail-safe system is achieved in such a manner that the engine does not start unless the stable state for engine starting is confirmed based on the detecting signals from two different detectors.

A recent vehicle is provided with various control units (ECUS) mutually connected to each other via an in-vehicle LAN, and various detectors for detecting a vehicle state send respective detecting signals to one or more necessary control units. It is preferable that the detecting signals from the above two detectors for determining the suitable state for engine starting be directly input into the engine control unit for controlling the engine, in order to avoid troubles or noise contamination in the middle of a communications path as much as possible. In view of this, in the present invention, the engine control unit may directly receive the neutral position signal and the operation displacement amount signal.

In a case where the suitable state for engine starting is determined based on the operation state of the shift operation tool, when the suitable state is not confirmed and the engine is not started, it is necessary for a driver or an inspector to grasp the reason why the engine is not started. In view of this, in a case where at least either the first safe state or the second safe state is unsettled in a start operation performed on the start operation tool, at least either notification of an unsettled event or recording of the unsettled event may be performed. In this configuration, the driver or the operator can find at least whether or not either of the two detecting signals as a result of detection of a shift state is related as a factor that prevents the engine from starting.

In a preferred embodiment of the present invention, the shift operation tool may be a swingable shift lever. The neutral position detector may be a limit sensor as a contact sensor or a proximity sensor as a non-contact sensor and is configured to detect the shift lever reaching the neutral position, and the operation displacement amount detector may be a potentiometer configured to detect a swing displacement amount of the shift lever to the neutral position. In the configuration of this example, the suitable state for engine starting is determined by use of detectors for detecting two events of the shift lever which two events create a shift state of the transmission device, that is, a position detector (for example, the neutral position detector) configured to detect whether or not the shift lever is at a predetermined shift position (the neutral position or a given shift position), and the operation displacement amount detector configured to detect movement of the shift lever with time. Both detectors can be used for other vehicle traveling controls, so that it is possible to achieve an advantage by the use of the detectors for different purposes.

DESCRIPTION OF THE INVENTION

Figure 1:
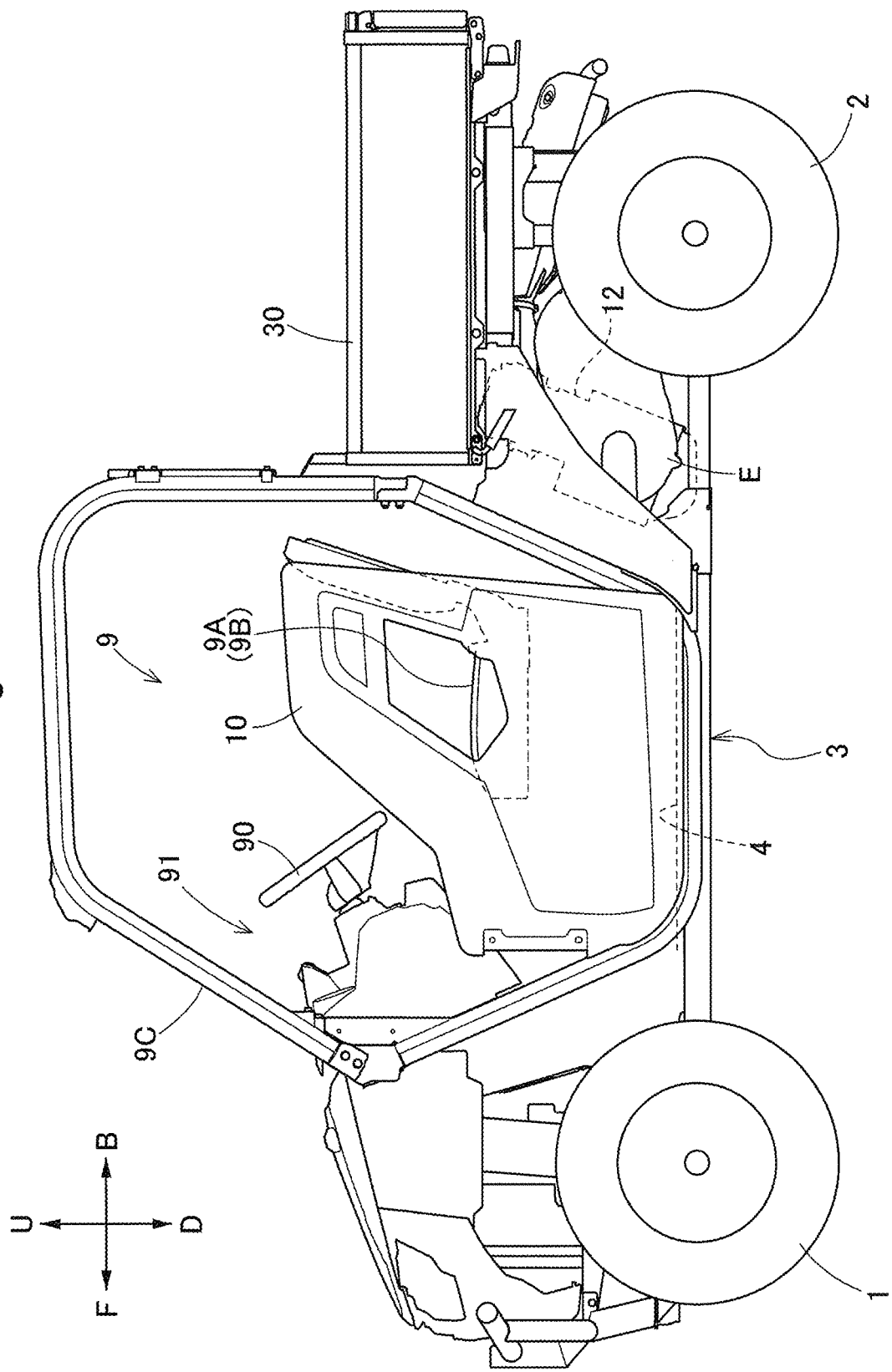
FIG. 1 is a left side view of a work vehicle.

The following describes a multipurpose vehicle as an example of a work vehicle of the present invention. Note that, in the following description, in terms of the multipurpose vehicle, a direction of an arrow F illustrated in the drawings is referred to as a "vehicle-body front side," a direction of an arrow B is referred to as a "vehicle-body rear side," a direction of an arrow U is referred to as a "vehicle-body upper side," a direction of an arrow D is referred to as a "vehicle-body lower side," a direction of an arrow L is referred to as a "vehicle-body left side," and a direction of an arrow R is referred to as a "vehicle-body right side."

As illustrated in FIG. 1, the multipurpose vehicle includes a pair of right and left front wheels 1 that are drivable and steerable, a pair of right and left rear wheels 2 that are drivable, and a body frame 3 supported by the front wheels 1 and the rear wheels 2 in such a manner as to be grounded. A driving section 9 is at a front portion of the body frame 3. A cargo box 30 is at a rear portion of the body frame 3. An engine E is under the cargo box 30. The driving section 9 is surrounded by a ROPS 9C.

Figure 2:
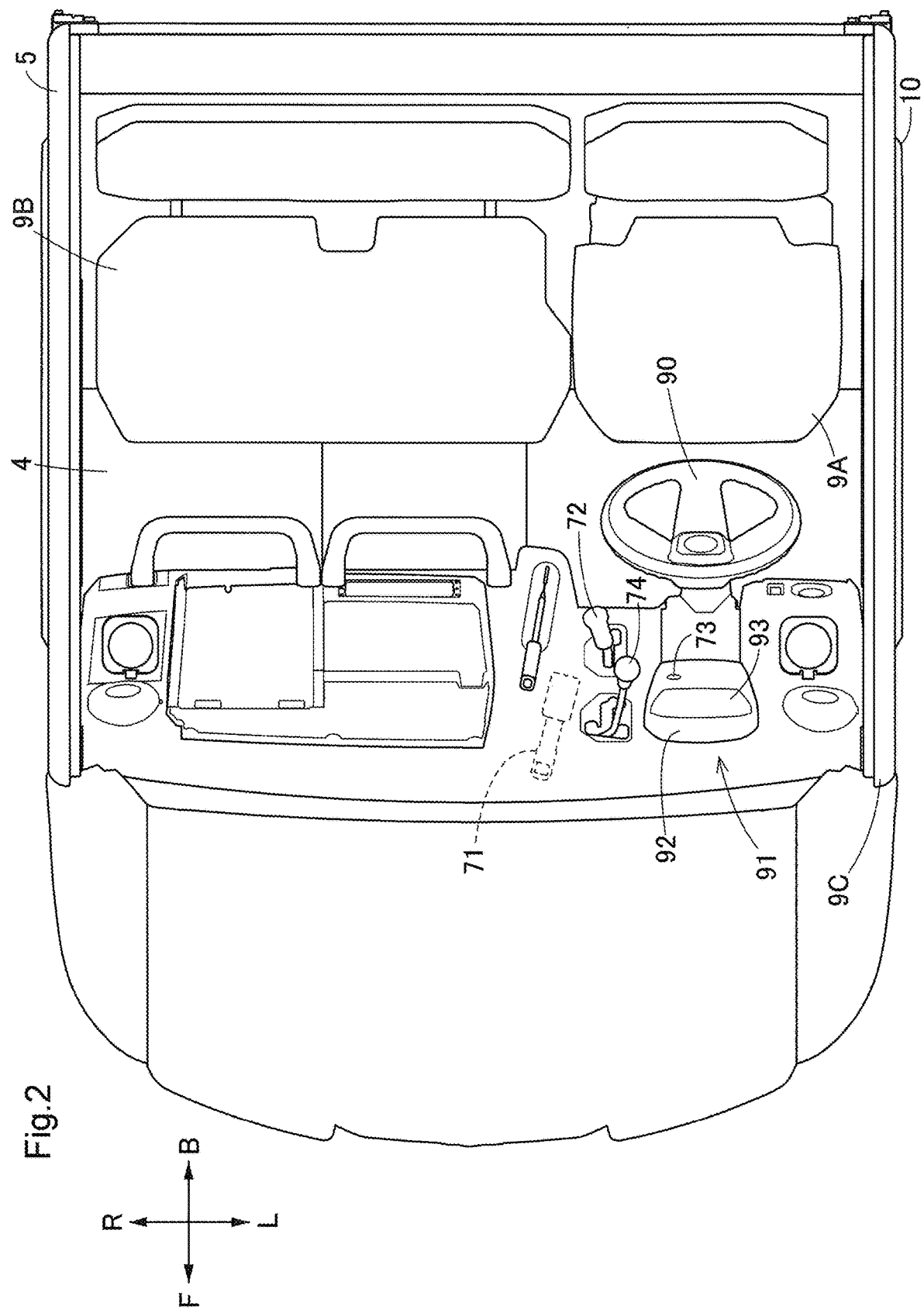
FIG. 2 is a plan view around a driver seat, a passenger seat, and a dashboard.

As illustrated in FIGS. 1, 2, the driving section 9 is provided with a driver seat 9A and a passenger seat 9B (see FIG. 2). A steering wheel 90 is forward of the driver seat 9A, and a dashboard 91 including an instrument panel 92 is forward of the steering wheel 90. A meter panel 93 as a display device, a touch panel, and various operation buttons are provided for the instrument panel 92. The driving section 9 is provided with manual operating tools such as an accelerator pedal 71 configured to adjust a traveling speed, a shift lever 72 configured to perform a shifting operation, a start operation tool 73 for engine starting, a 2WD-4WD switching lever 74 configured to switch between 2WD and 4WD, and a brake pedal (not illustrated) configured to perform braking.

Figure 3:
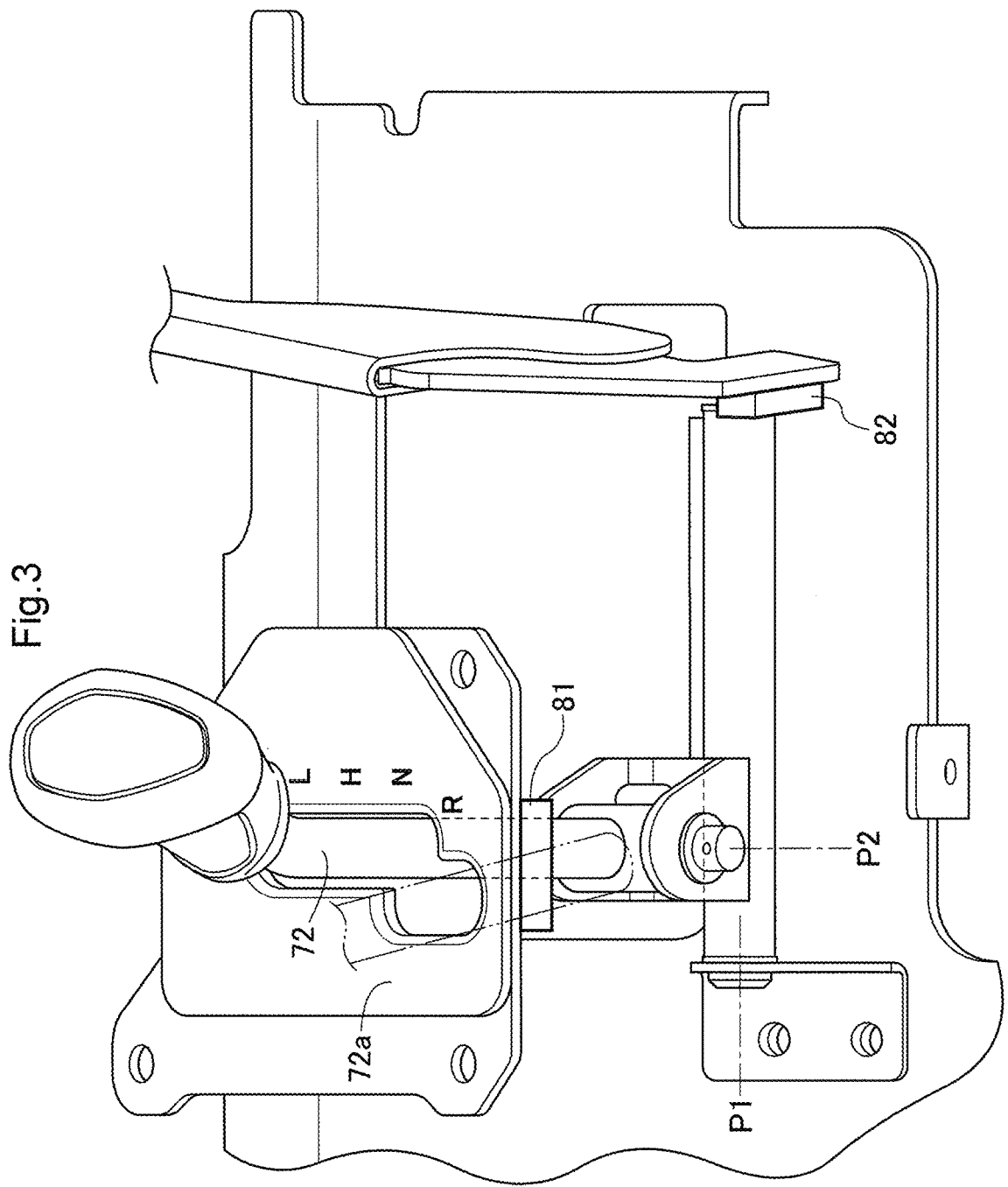
FIG. 3 is a perspective view illustrating a shift lever, a neutral position detector, and an operation displacement amount detector.

As illustrated in FIG. 3, in this embodiment, the shift lever 72 can be displaced along a guide groove formed in a guide plate 72a and can switch a transmission device T2 (see FIG. 4) between four shifting positions including a low position (indicated by L in FIG. 3), a high position (indicated by H in FIG. 3), a neutral position (indicated by N in FIG. 3), and a reverse position (indicated by R in FIG. 3). The shift lever 72 is guided by the guide plate 72a to be displaced in a lengthwise direction from the low position to the neutral position, to be displaced in a lateral direction from a right neutral position to a left neutral position, and to be further displaced in the lengthwise direction from the left neutral position to the reverse position. The shift lever 72 is a swingable lever, and the low position, the high position, the neutral position, and the reverse position of the shift lever 72 are selected by swinging displacement.

The shift lever 72 is swingable around a first swing axis P1 and around a second swing axis P2. The displacement of the shift lever 72 from the low position to the right neutral position via the high position is achieved by swinging the shift lever 72 around the first swing axis P1. The displacement of the shift lever 72 from the right neutral position to the left neutral position is achieved by swinging the shift lever 72 around the second swing axis P2. The displacement of the shift lever 72 from the left neutral position to the reverse position is achieved by swinging the shift lever 72 around the first swing axis P1.

A neutral position detector 81 detects the shift lever 72 being at the neutral position. Here, the neutral position detector 81 is constituted by a limit switch. The neutral position detector 81 is turned on in contact with the shift lever 72 at the neutral position and outputs a neutral position signal. When the shift lever 72 is displaced from the neutral position, the neutral position detector 81 is turned off and does not output the neutral position signal.

An operation displacement amount detector 82 detects a swing amount of the shift lever 72 around the first swing axis P1, that is, a displacement amount of the shift lever 72 in the lengthwise direction. Here, the operation displacement amount detector 82 is constituted by a potentiometer and outputs an operation displacement amount signal corresponding to a swing displacement amount of the shift lever 72 in the lengthwise direction. The shift lever 72 is determined to be at the neutral position when the operation displacement amount signal has a predetermined value.

Figure 4:
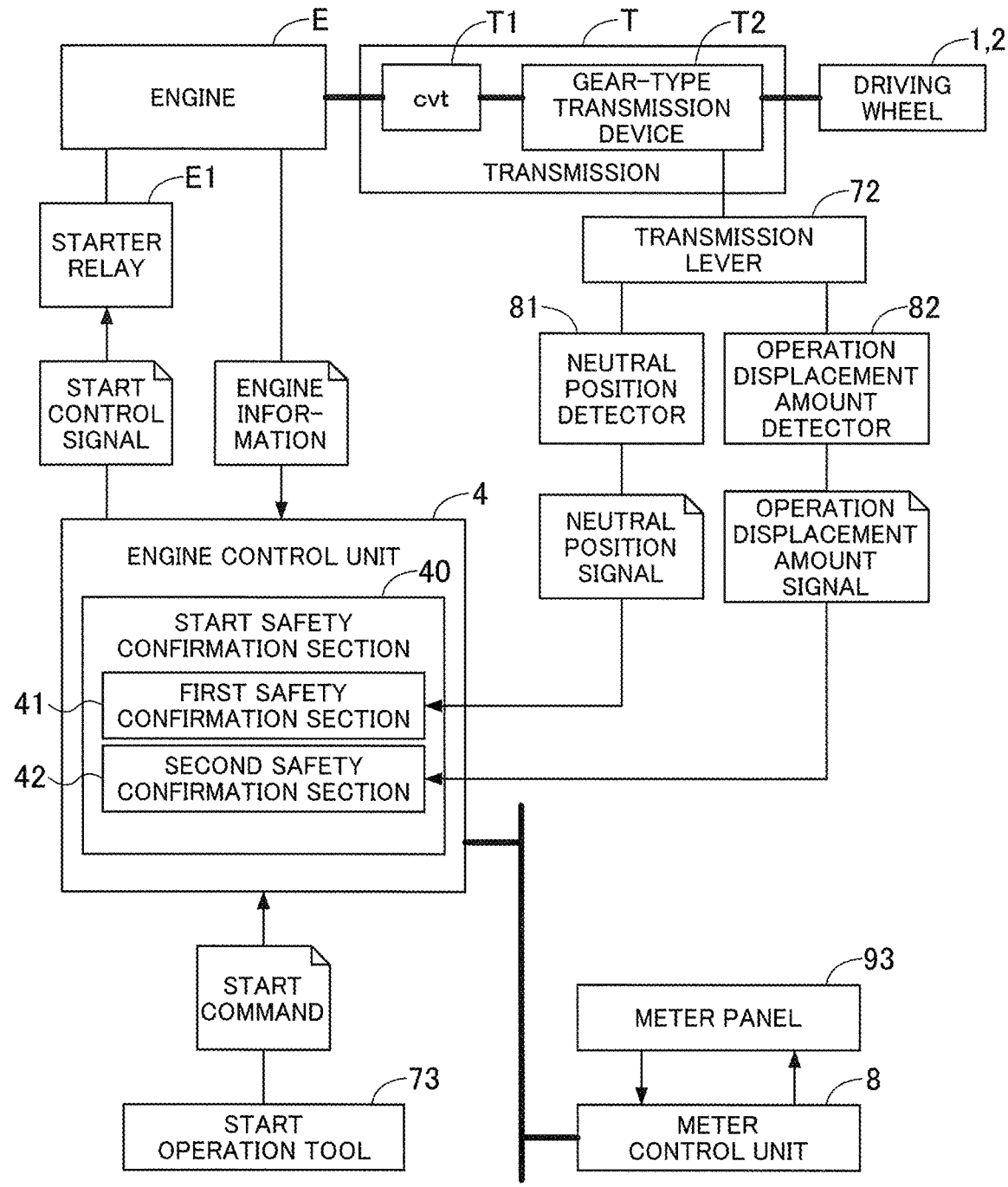
FIG. 4 is a functional block diagram illustrating the relationship between an engine control unit in a control system of the work vehicle, a detection signal indicative of a shifting state of a transmission device, and a start command.

FIG. 4 is a functional block diagram illustrating a driving system of the work vehicle and a control system related to engine starting. The driving system includes the engine E and a transmission T configured to shift power from the engine E and transmit it to driving wheels (the front wheels 1 and the rear wheels 2). The work vehicle can select 4WD and 2WD, and the driving wheels are the front wheels 1 and the rear wheels 2. The transmission T includes a continuously variable transmission device T1 configured to receive engine power first, and the gear-type transmission device T2 configured to shift power from the continuously variable transmission device T1. The continuously variable transmission device T1 is constituted by a CVT (a belt-type continuously variable transmission device). The transmission device T2 includes a low position, a high position, a neutral position, and a reverse position, and each shift position is selected by the shift lever 72.

A core element of the control system related to engine starting is an engine control unit 4. The engine control unit 4 receives a start command from the start operation tool 73. The engine control unit 4 outputs a start control signal to a starter relay E1 attached to the engine E. The starter relay E1 is turned on in response to the start control signal and starts the engine E. The engine control unit 4 receives various pieces of engine information on an engine rotation speed, a hydraulic pressure state, and the like from the engine E, and the engine control unit 4 outputs, to the engine E, various engine control signals such as an ignition timing.

The engine control unit 4 includes a start safety confirmation section 40, and the start safety confirmation section 40 includes a first safety confirmation section 41 and a second safety confirmation section 42. The first safety confirmation section 41 confirms a first safe state in which the shift lever 72 is at the neutral position, in response to the neutral position signal from the neutral position detector 81. The second safety confirmation section 42 confirms a second safe state in which the shift lever 72 is at the neutral position, in response to the operation displacement amount signal from the operation displacement amount detector 82. The start safety confirmation section 40 confirms a safe state in which engine starting is performable, in response to the first safety confirmation section 41 confirming the first safe state and the second safety confirmation section 42 confirming the second safe state.

In response to a start operation performed on the start operation tool 73 with the start safety confirmation section 40 confirming the safe state, the start operation tool 73 outputs a start command to the engine control unit 4. Hereby, the engine control unit 4 provides the start control signal to the starter relay E1, so that the engine E starts.

Even in a case where the engine control unit 4 receives the start command from the start operation tool 73, when the start safety confirmation section 40 does not confirm the safe state, the engine control unit 4 does not provide the start control signal to the starter relay E1. Thus, even in a case where a start operation is performed on the start operation tool 73, when at least either the first safe state or the second safe state is not confirmed and therefore the start safety confirmation section 40 does not confirm the safe state, the engine E is not started, and a factor (an unsettled event) causing such an unsettled state is stored in a memory.

The engine control unit 4 is connected to a meter control unit 8 via an in-vehicle LAN in such a manner as to exchange data therewith. The meter control unit 8 acquires detecting signals indicative of a vehicle driving state, a vehicle operation state, a driver state, and the like from various sensors provided for a vehicle device group. The meter control unit 8 notifies the vehicle driving state, the vehicle operation state, and the driver state via various meters, a lamp, and a touch panel 94 on the meter panel 93. For example, in a case where the start safety confirmation section 40 does not confirm the safe state due to the unsettled even at the time when the start operation is performed on the start operation tool 73, the unsettled event, e.g., a non-neutral state of the transmission device T2 is notified via the meter panel 93.

Alternative Embodiments (1) In the above embodiment, the neutral position detector 81 is constituted by a contact-type limit switch, but other detectors such as a contactless proximity sensor (a reed switch or the like) may be used. Similarly, instead of the potentiometer as the operation displacement amount detector 82, other detectors such as an encoder may be used.

(2) The above embodiment deals with only the neutral state of the transmission device T2 as engine start check, but other engine start check targets may be added by a similar technology configuration. For example, in a case where a PTO device is provided, two different detectors for detecting a PTO clutch being in a neutral state may be provided, and the start safety confirmation section 40 may add the neutral state of the PTO clutch to the engine start check as a third safe state.

(3) In the above embodiment, the neutral position detector 81 and the operation displacement amount detector 82 detect the operation state of the shift lever 72 as the shift operation tool. However, instead of this, an operation state of a clutch operation body (for example, a solenoid, a cylinder, or the like) configured to perform a clutch operation based on the operation of the shift lever 72 may be detected. That is, the shift operation tool of the present invention also includes such a clutch operation body.

(4) In the above embodiment, the shift lever 72 is a swingable lever. However, instead of this, a slidable shift lever 72, a rotatable shift lever 72, or a shift lever 72 in a given combination of the swingable type, the slidable type, and the rotatable type may be used.

(5) In the above embodiment, the multipurpose vehicle is employed as the work vehicle, but instead of this, a mower, a snowmobile, an off-road vehicle, and the like may be employed.

Note that the configurations described in the above embodiment (including the alternative embodiments; the same applies hereinafter) can be applied in combination with configurations of other embodiments as long as no inconsistency occurs. The embodiments described in the present specification are illustrative and should not be construed as limiting the present invention. Modifications to the present invention are permissible, as long as they do not deviate from the scope that can achieve the objects of the present invention.

INDUSTRIAL APPLICABILITY

The present invention is applicable to a work vehicle including a device having a state in which the starting of an engine is checked.

DESCRIPTION OF THE REFERENCE NUMERALS

4: engine control unit
8: meter control unit
40: start safety confirmation section
41: first safety confirmation section
42: second safety confirmation section
72: shift lever (shift operation tool)
73: start operation tool
81 neutral position detector
82: operation displacement amount detector
E: engine
E1: starter relay
T: transmission
T1: continuously variable transmission device
T2: transmission device

The invention claimed is:

1. A work vehicle, comprising:
an engine;
a start operation tool configured to output a start command;
a shift operation tool configured to operate a shift position of a transmission device;
an engine control unit configured to start the engine based on the start command and an operation state of the shift operation tool;
a neutral position detector configured to detect the shift operation tool being at a neutral position and output a neutral position signal; and
an operation displacement amount detector configured to detect an operation displacement amount of the shift operation tool and output an operation displacement amount signal, wherein the engine control unit comprises:
- a first safety confirmation section configured to confirm a first safe state in which the shift operation tool is at the neutral position, in response to the neutral position signal; and
- a second safety confirmation section configured to confirm a second safe state in which the shift operation tool is at the neutral position, based on the operation displacement amount; and wherein the engine control unit is configured to start the engine in response to the start command received with the first safe state and the second safe state being confirmed.

2. The work vehicle according to claim 1, wherein:
the engine control unit directly receives the neutral position signal and the operation displacement amount signal.

3. The work vehicle according to claim 1, wherein:
in a case where at least either the first safe state or the second safe state is unsettled in a start operation performed on the start operation tool, at least either notification of an unsettled event or recording of the unsettled event is performed.

4. The work vehicle according to claim 1, wherein:
the shift operation tool is a swingable shift lever,
the neutral position detector is a limit sensor as a contact sensor or a proximity sensor as a non-contact sensor and is configured to detect the shift lever reaching the neutral position, and
the operation displacement amount detector is a potentiometer configured to detect a swing displacement amount of the shift lever to the neutral position.

* * * * *